United States Patent [19]
Miller et al.

[11] 3,820,620
[45] June 28, 1974

[54] VEHICLE POWER STEERING ELECTROHYDRAULIC SAFETY BACKUP SYSTEM

[75] Inventors: Wayne Russel Miller; Charles George Termont, both of Dubuque, Iowa

[73] Assignee: Deere & Company, Moline, Ill.

[22] Filed: Mar. 29, 1973

[21] Appl. No.: 345,906

[52] U.S. Cl. .............................. 180/79.2 R, 60/405
[51] Int. Cl. .............................................. B62d 5/06
[58] Field of Search ....... 180/79.2 R; 60/405; 417/3

[56] References Cited
UNITED STATES PATENTS

| | | | |
|---|---|---|---|
| 3,528,522 | 9/1970 | Turke | 180/79.2 R X |
| 3,558,239 | 1/1971 | Shiber | 417/3 |
| 3,762,492 | 10/1973 | Ron | 180/79.2 R |

*Primary Examiner*—David Schonberg
*Assistant Examiner*—John A. Pekar

[57] ABSTRACT

Disclosed is a vehicle power steering system including an electrohydraulic safety backup system for supplying fluid pressure to the steering motor of the vehicle when a main pump becomes inoperative to supply pressure fluid to the steering motor. The safety backup system includes an electrical circuit which is incorporated in the ignition and starting circuits of the vehicle such that the operability of the backup system is automatically checked at every starting of the vehicle. Also, the electrical circuit is "armed" in response to the starting circuit becoming energized during each starting of the vehicle engine. The electrical circuit includes a fluid condition-responsive switch which is closed to complete a circuit to a control for effecting the energization of an electric motor for driving an auxiliary pump when the fluid pressure being delivered by the main hydraulic pump becomes insufficient to adequately drive the steering motor.

11 Claims, 4 Drawing Figures

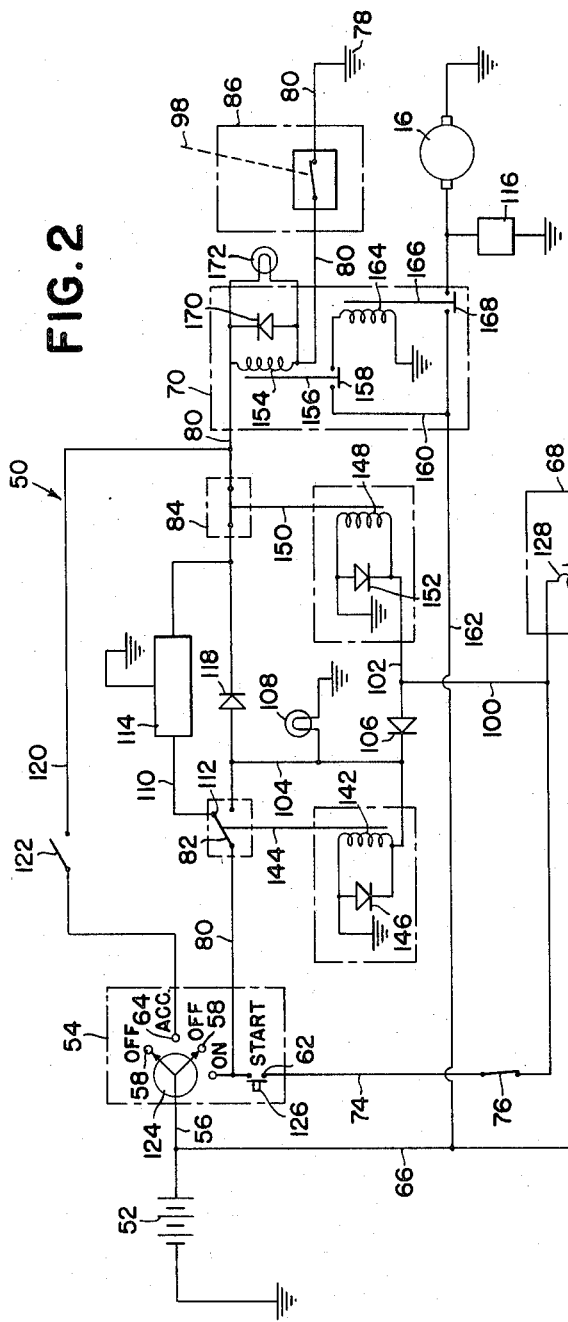
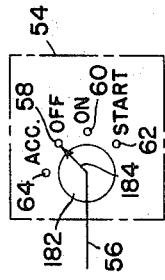
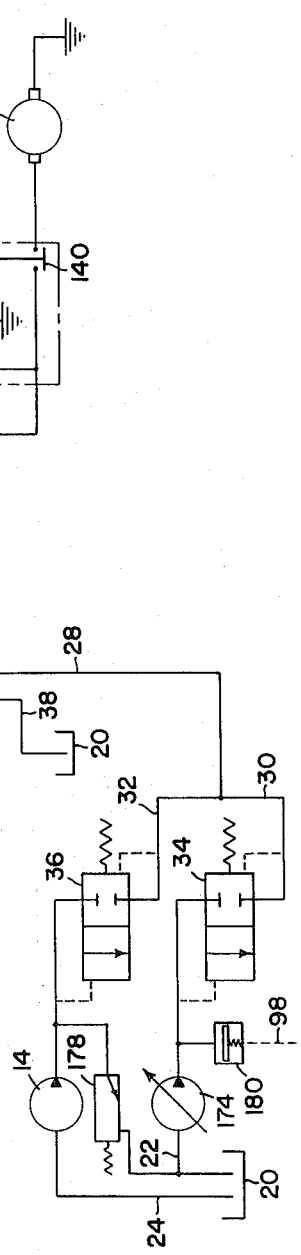
FIG. 2
FIG. 4
FIG. 3

VEHICLE POWER STEERING ELECTROHYDRAULIC SAFETY BACKUP SYSTEM

BACKGROUND OF THE INVENTION

The present invention relates to a vehicle power steering system and more particularly relates to a hydraulic power system incorporating an electrohydraulic backup system.

Prior art hydraulic power steering systems are known which comprise main and auxiliary pumps for supplying the fluid pressure for driving steering motor means, the auxiliary pump being driven by an electric motor which is energized only when the fluid delivered by the main pump is inadequate for operating the steering motor means.

These known steering systems are not entirely satisfactory since components of the backup portions of the systems may become inoperable, due to long periods of dormancy, without the knowledge of the operator. While some of these known systems do have controls for manually operating some of the backup system components, such as the electric motors and auxiliary pumps, these systems still do not solve the problems attendant with dormant backup system components since an operator may neglect to periodically operate the backup system components.

SUMMARY OF THE INVENTION

According to the present invention, there is provided a vehicle power steering system including an auxiliary pump driven through means of an electric motor, and more particularly, there is provided an improved electrical circuit for controlling the operation of the electric motor.

An object of the invention is to provide an electrical circuit which is incorporated in the ignition and starting circuitry of a vehicle so as to cause the various components of the backup portion of the steering system to be at least momentarily operated automatically in response to an operator turning on an ignition switch. A related object is to provide such circuitry which includes a motor control circuit which is armed and disarmed, respectively, in response to an operator performing ordinary engine starting and shutdown procedures. A more specific object is to provide an electric motor control circuit which is connected to the "on" contacts of conventional ignition and starting switch means, and to control the flow of current through the control circuit through means of an arming switch and a fluid condition-responsive switch connected in series with each other and with the "on" contact, the arming switch being controlled through means of an arming switch control connected to a "start" contact of the ignition and start switch means and the fluid condition-responsive switch being controlled by a fluid-sensing means connected in fluid communication with the output of the main pump.

Another object of the invention is to provide in an electric motor control circuit, as described above, a test circuit including a time delay switch for completing and maintaining a circuit to the pump motor control means for effecting actuation of the electric motor for driving the auxiliary pump for a predetermined interval after the ignition and start switch means have been operated to connect a source of electrical energy to the "on" contact.

Yet another object of the invention is to provide an electric motor control circuit which includes a manually controllable circuit by which the electric motor for driving the auxiliary pump can be actuated at the will of the operator.

These and other objects will be apparent from the following description and the appended drawings.

BRIEF DESCRIPTION OF THE DRAWINGS

FIG. 2 is a more detailed schematic electrical circuit diagram of the electrical circuit portion of the system shown in FIG. 1.

FIG. 3 is a schematic of an alternate to the hydraulic system shown in FIG. 1.

FIG. 4 is a schematic of an alternate to the ignition and starting switch means shown in FIG. 2.

DESCRIPTION OF THE PREFERRED EMBODIMENT

Figure 1:
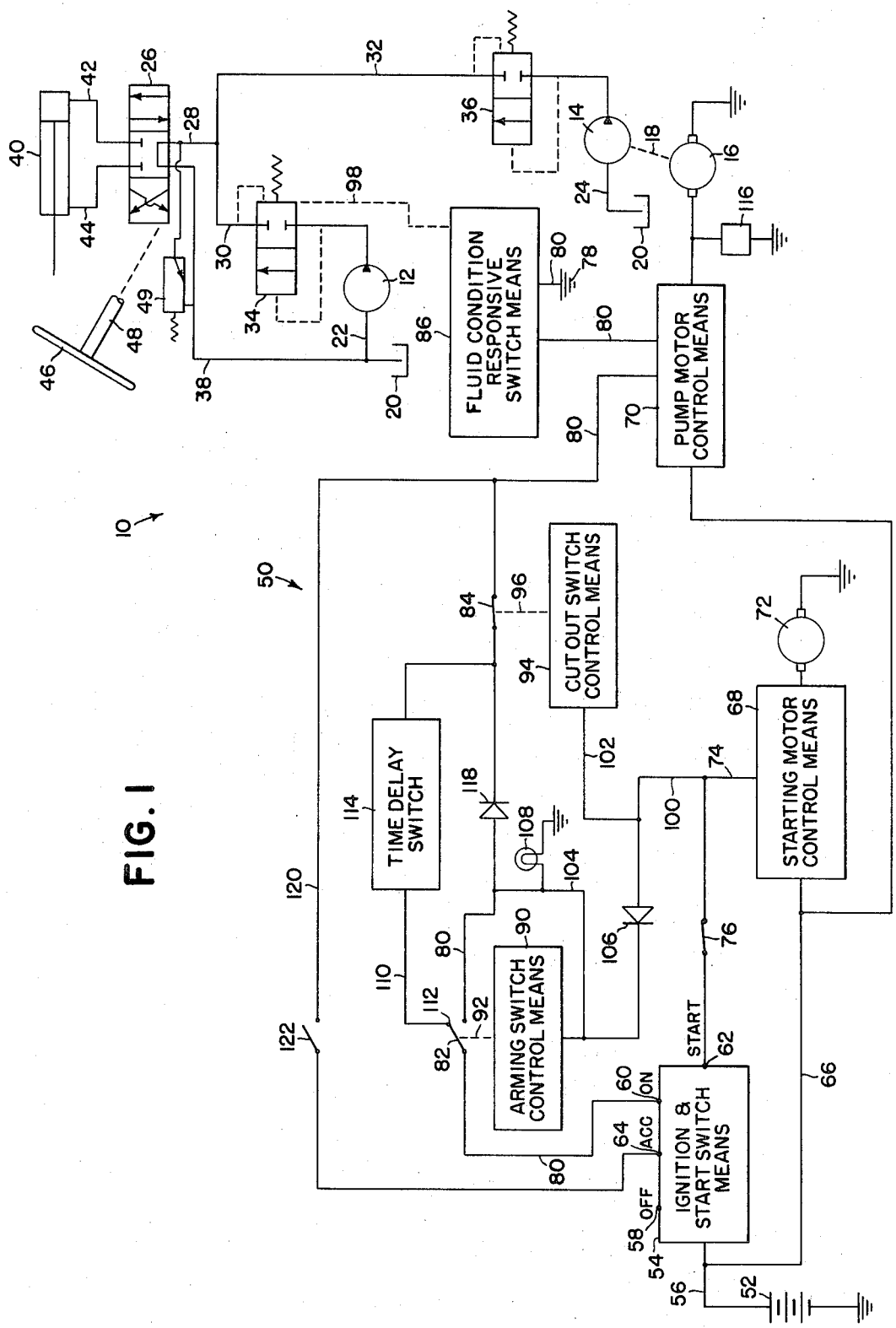
FIG. 1 is a combined schematic electric and hydraulic circuit diagram of an electrohydraulic vehicle power steering system including a backup system in accordance with the present invention.

Referring to FIGS. 1 and 2 of the drawings, therein is shown a combined main and backup hydraulic power steering system indicated in its entirety by the reference numeral 10. The steering system 10 includes fixed displacement main and auxiliary pumps 12 and 14, respectively, the main pump being driven directly from the vehicle engine (not shown) in a manner conventional in the art and the auxiliary pump 14 being driven by an electric pump motor 16 drivingly connected to the auxiliary pump through conventional means (not shown) indicated here by the dashed line 18. While it is preferable that the auxiliary pump 14 be driven by a power source other than the vehicle engine, the pump may be driven by any electrically responsive drive means without departing from the principles of the invention. For example, an electromagnetic clutch could be used to engage a drive coupling between an output shaft of the vehicle transmission and the pump 14. The main and auxiliary pumps 12 and 14 have inlets connected to a reservoir 20 through means of suction conduits 22 and 24, respectively. The main and auxiliary pumps 12 and 14 respectively have outlets connected to an inlet port of a steering control valve 26 through means of a feed conduit 28 having a first branch 30 connected to the outlet of the main pump and having a second branch 32 connected to the outlet of the auxiliary pump. Located in the first and second conduit branches 30 and 32 are one-way check valves 34 and 36, respectively, for allowing flow only in the direction of the control valve 26 from the main and auxiliary pumps 12 and 14. The control valve 26 also includes an exhaust port, which is connected to the reservoir 20 through means of a return conduit 38, and includes a pair of supply ports respectively connected to the opposite work ports of a reversible steering motor 40 through means of supply conduits 42 and 44. The control valve 26 is here shown as a three-position, four-way, open-center valve positioned in a centered neutral position wherein fluid is blocked in the opposite work ports of the steering motor 40 and the feed conduit 28 is connected to the reservoir 20. A steering wheel 46 is operatively connected to the control valve 26 in a conventional manner (not shown) indicated here by the dashed line 48 and by which turning of the steering wheel in a first direction effects rightward shifting of the control valve to connect the right- and left-hand work ports of the steering motor respectively to the return and feed conduits 28 and 38, and by which turning of the steering wheel 46 in the opposite direction effects leftward shifting of the control valve to connect the right- and left-hand work ports of the steering motor respectively to the feed and supply conduits. A relief valve 49 is located in the feed conduit 28 and is operative to connect the conduit 28 to the reservoir 10 when a predetermined maximum pressure is built up in the conduit 28.

The operation of the electric pump motor 16, and hence the operation of the auxiliary pump 14, is controlled through means of an electrical system, here indicated in its entirety by the reference numeral 50. Referring first to FIG. 1, the electrical system 50 includes a source of electrical current shown here as a battery 52 having its negative terminal connected to ground and having its positive terminal connected to an ignition and start switch means 54 through means of a lead 56. The ignition and start switch means 54 may be of any type having "off", "on", "start" and "accessories" output contacts 58, 60, 62 and 64, respectively, and including switching means movable among the output contacts to respectively effect an "off" condition wherein the battery 52 is connected to the contact 58, an "on" condition wherein the battery is connected to the contact 60, a "start" condition wherein the battery is connected to the contacts 62 and 64 and an "accessories" condition wherein the battery is connected to the contact 62.

A main power line 66 is connected to the lead 56 between the battery 52 and the switch means 54 and connected to the power line 66 in parallel with each other are a starting motor control means 68 and a pump motor control means 70. The starting motor control means 68 and the pump motor control means 70 are normally in conditions blocking the flow of electrical current between the power line 66 and the motors 72 and 16 but are respectively energizable for effecting conditions wherein the power line 66 is connected to the motors 72 and 16. For the purpose of conveying current for energizing the starting motor control means 68, a starting motor control current line 74 is connected between the "start" contact 62 and the starting motor control means 68. The control current line 74 contains a neutral start switch 76 which is in a closed position as shown only when the vehicle transmission is in a neutral condition. Connected between the "on" contact 60 and a ground connection 78, for the purpose of conveying current to the pump motor control means, is a main control current line 80 in which a normally open arming switch 82, a normally closed cutout switch 84 and a normally closed fluid condition-responsive switch means 86 are connected in series. The pump motor control means 70 is connected to the control current line 80 at a location between the cutout switch 84 and the fluid condition-responsive switch means 86. The position of the arming switch 82 is controlled through means of an arming switch control means 90 connected thereto in a conventional manner indicated here by the dashed line 92. Similarly, a cutout switch control means 94 is connected to the cutout switch 84 through means indicated here by the dashed line 96. The fluid condition-responsive switch means 86 is controlled in response to the movement of the check valve 34 and is connected thereto by means indicated here by the dashed line 98. When the arming switch control means 90 is energized, it acts to close the arming switch 82 and the current for energizing the arming switch control means passes to the latter along an arming switch control current line 100 which is connected to the starting motor control current line 74 at a location between the neutral start switch 76 and the starting motor control means 68. It will thus be seen that when the ignition and start switch means 54 is actuated to effect a start condition wherein the battery 52 is connected to the "on" and "start" contacts 60 and 62, respectively, and the vehicle transmission is in a neutral condition wherein the switch 76 is closed, current will flow to the arming switch control means to energize the same and effect closing of the arming switch 82. At the same time, a cutout switch control current line 102 extending between the line 100 and the cutout switch control means 94 will convey current to energize the control means 94 and effect the opening of the normally closed cutout switch 84. Extending between the arming switch control current line 100 and the main control current line 80 at a location between the arming and cutout switches 82 and 84, respectively, is a latching current line 104 which serves to convey current to the arming switch control means, once the arming switch 82 has been closed, in order to maintain current flow to the arming switch control means after the vehicle engine has started and the ignition and start switch means is actuated to disconnect the battery 52 from the "start" contact 62. A diode 106 is located in the line 100 between the lines 102 and 104 for the purpose of preventing the flow of current from the latching current line 104 to the starting motor control means 68 and the cutout switch control means 94. A light 108 is connected to the latching current line 104 and indicates the operability of the arming switch control means and the latching current lead 104 by being lit after the vehicle engine has started. When the vehicle engine has started, the main pump 12 will be driven by the vehicle engine and the fluid delivered by the pump 12 will cause the check valve 34 to shift rightwardly from its normally closed position shown to establish a condition wherein fluid is permitted to flow from the pump 12 to the steering valve 26. This shifting movement of the valve 34 effects the opening of the fluid condition-responsive switch means 86. Thus, once the vehicle is started, the arming and cutout switches 82 and 84 will be closed and the flow of current through the line 80 will be prevented only by the fluid condition-responsive switch means 86, which is open.

The operator is apprised of the operability of the pump motor control means 70 and the pump motor 16 each time the operator starts the vehicle engine through means of a testing circuit including a test current line 110 having a contact 112 at one end thereof which is engaged by the arming control switch 82 when the latter is opened as disclosed. The arming switch 82 thus acts to connect the "on" contact of the ignition and starting switch means 54 to the contact 112 when the switch 82 is open. The other end of the test current line 110 is connected to the control current line 80 at a location between the latching current line 104 and the cutout switch 84. Located in the test current line 110 is a time delay switch 114 of a type that normally is in an "off" condition establishing an open circuit in the line 110 but which closes to establish a circuit through the line 110 for a predetermined interval upon receiving an electrical signal. Thus, it will be appreciated that when the system 10 is in the condition as illustrated in FIG. 1 and the ignition and start switch means is actuated so as to connect the battery 52 only to the "on" contact 60, the time delay switch will be energized to complete a circuit through the test current line 110 and current will pass from there through the closed switch 84 to the pump motor control means 70 to energize the latter and effect the connection of the power line 66 to the pump motor 16. Connected between the motor control means 70 and the pump motor 16 is a warning device 116 which may be any conventional device such as an electrically responsive buzzer, bell, flashing light or the like, which will apprise the operator of the fact that the auxiliary pump 14 and hence the auxiliary steering system is in operation. Current is prevented from flowing from the test current line 110 to the latching current line 104 through means of a diode 118.

The operation of the auxiliary pump 14 may sometimes be desired when the vehicle engine is not running and for this purpose a manual control current line 120 is connected between the "accessories" contact of the ignition and start switch means 54 and the control current line 80 at a location between the cutout switch 84 and the pump motor control means 70. The line 120 contains a manually operable switch 122 which is movable between an open position, as disclosed, and a closed position for establishing a path for the flow of current to the pump motor control means. The operator can thus actuate the motor 16 by merely moving the ignition and start switch means to connect the battery 52 to the "accessories" contact 64 and by then closing the switch 122.

Referring now to FIG. 2 for the details of the electrical circuit described above, it can be seen that a first expample of the ignition and start switch means 54 is shown which comprises a rotary ignition switch 124 of a type including the "off", "on" and "accessories" contacts 58, 60 and 64, respectively, and a start switch 126 including the start contact 62 connected in series with the "on" contact 60. The ignition switch 124 is a type capable of simultaneously connecting the battery 52 to the "on" contact 60 and the "accessories" contact 64. Thus it can be seen that the starting motor control means 68 may be energized by first moving the ignition switch 124 to connect the battery 52 to the contact 60 and then by depressing the normally open start switch 126 to establish a path for current flow to the starting motor control means 68. The starting motor control means 68 includes a relay coil 128 which is connected to the control current line 74 and is coiled about a stem 130 to which is fixed the contact of a normally open switch 132. The switch 132 is located in a control current line 134 having one end connected to the power line 66. Connected to the other end of the line 134 is a coil 136 which is encircled about a stem 138 to which is fixed a contact of a normally open switch 140 located in the power line 66 between the connection of the line 134 with the power line and the motor 72. Thus, it will be appreciated that when the line 74 is energized, the coil 128 will in turn be energized to close the contacts of the switch 132, the closing of the switch 132 effecting a current path to the coil 136 which is thus energized and acts to close the switch 140 to effect a current path to the motor 72. The use of two relays to effect the closure of the switch 140 is necessitated by the fact that the contact of the switch 140 must be quite heavy in order to carry the current required for the starting motor 72 and that the current in the line 74 at the coil 128 would normally be insufficient to create a magnetic field of a force sufficient to close such a heavy contact.

The arming switch control means includes a relay coil 142 which is connected to the line 100 and encircles a stem 144 which is connected to the contact of the arming relay switch 82. Connected in parallel with the relay coil 142 is a diode 146 which acts to prevent a flow of current, resulting from the collapsing field at the coil 142 when the latter is de-energized, from passing to ground to thus prevent sparking from occurring at the switch 82.

Similarly, the cutout switch control means includes a relay coil 148 connected to the control current line 102 and encircled about a stem 150 to which the contact of the cutout switch 84 is connected. Connected in parallel with the relay 148 is a diode 152 for preventing the current, resulting from the collapsing field at the coil 158 when the latter is de-energized, from passing to ground to thus prevent sparking at the switch 76 or at the switch 168.

The pump motor control means 70 is similar to the starting motor control means 68 in that it includes a first relay coil 154 connected to the line 80 and encircled about a stem 156 fixed to the contact of a normally open switch 158 located in a control current line 160 connected to a branch 162 of the power line 66. A second relay coil 164 is connected to the control current line 160 and is encircled about a stem 166 which is connected to a contact of a normally open switch 168 located in the power line branch 162 between the pump motor 16 and the connection of the control line 160 with the power branch line 162. The use of the two relay coils 154 and 164 to control the actuation of the contact of the switch 168 is necessitated by the fact that the contacts of the switch 168 must be quite large to accommodate the current necessary for operating the pump motor 16 and the current at the line 80 would normally be inadequate to establish enough magnetic force to operate such a heavy contact. Connected in parallel with the relay coil 154 is a diode 170 which prevents the flow of current, resulting from a collapsing field at the coil 154 when the latter is de-energized, from passing to ground to thus prevent sparking at the cutout, manually controllable and flow sensing switches 84, 122 and 98, respectively. Also connected in parallel with the relay coil 154 is a light 172 which would apprise the operator of the fact that current is flowing through the control line 80.

Referring now to FIG. 3, therein is shown the modifications necessary to the hydraulic portion of the system shown in FIG. 1 in order to change from the open-center system of FIG. 1 to a closed-center system. It is to be noted that the parts of FIG. 3 which are common with those in FIG. 1 are given the same reference numerals. Since the hydraulic system here is a closed-center system, a variable displacement, pressure compensated main pump 174 is used in lieu of the fixed displacement main pump 12 and a blocked center steering valve 176 is used in lieu of the open-center steering valve 26 described above. Located in the feed line branch 32 between the check valve 36 and the auxiliary pump 14 is a relief valve 178 which is operable for connecting the output of the pump 14 to the reservoir 20 at a predetermined maximum pressure. Located between the main pump 174 and the check valve 34 is a pressure sensitive element here shown as a piston 180 which is connected to the fluid condition-responsive switch means 86 through means represented by the dashed line 98. The piston 180 is responsive to pressure in the feed line branch 30 so as to maintain the fluid condition-responsive switch means in an open circuit-effecting condition when the output of the pump 174 is adequate for operating the steering motor 40 and which moves the fluid condition-responsive switch means so as to effect a closed circuit when the pressure at the output of the pump 174 falls to a predetermined minimum.

Referring now to FIG. 4, therein is shown a second example of an ignition and start switch means 54 with which the present invention may be used. Specifically, the ignition and starting switch means 54 shown here includes a rotary ignition and start switch 182 of a conventional type having a switching element 184 movable among the "off", "on", "start" and the "accessories" contacts 58, 60, 62 and 64, respectively, the element 184 being operative to simultaneously connect the battery 52 to the "on" and "start" contacts when the switching element is turned to a maximum clockwise position and the switching element being biased in that position to return to a position wherein it only connects the "on" contact to the battery, as when the operator releases the switching element when the vehicle engine has started.

The operation of the steering system 10 is as follows. Assuming that the system 10 includes an ignition and starting switch means as disclosed in FIG. 2 and has an open-center hydraulic system as disclosed in FIG. 1 and further assuming that the ignition switch 124 is in the condition illustrated whereat the battery 52 is connected to the "off" contact 58 and the start switch 126 is open as shown, the vehicle will not be operating to drive the main pump 12, and the auxiliary pump 14 will likewise not be in operation since no current will be flowing to the pump motor 16. Also, since the main pump 12 is not delivering any fluid, the check valve 34 will be closed and consequently the fluid condition-responsive switch means 86 will also be closed.

The operator may then begin the starting procedure of the vehicle in the conventional manner by manually operating the ignition switch 124 so as to connect the battery 52 to the "on" and "accessories" contacts 60 and 64. Since the arming switch 82 is now open and connects the control line 80 to the test circuit line 110, current will now flow to the time delay switch 114 and energize the same to complete a circuit to the relay coil 154 of the pump motor control means 70, it being noted that the cutout switch 84 is now closed. When the coil 154 is energized, the stem 156 moves so as to close the normally open switch 158 to complete the circuit to the relay coil 164 which acts in turn on the stem 166 to effect the closure of the normally open switch 168. When the switch 168 closes, the power line current is connected to the motor 16 and to the warning device 116. If the warning device 116 is actuated, the operator will know that those portions of the circuit required for operating the warning device are operable. After a predetermined interval of time, the time delay switch 114 will return to its normal condition wherein it effects an open circuit through the line 110 thus deactivating the motor 16 and the warning device 116.

Assuming that the electrical system 50 has thus far appeared to be operable, the operator will then manually close the start switch 126 so as to connect the battery 52 to the start contact 62. If the vehicle transmission is in the neutral condition, the neutral start switch 76 will be closed and current will flow to the relay coil 128 of the starting motor control means 68. The energization of the relay 128 will cause the stem 130 to move and effect the closure of the normally open switch 132, this operation in turn effecting the energization of the relay coil 136 which effects the shifting of the stem 138 to close the normally open switch 140. When the switch 140 closes, the power line 66 is connected to the starting motor 72 and the vehicle engine is cranked. With the closure of the start switch 126, current simultaneously passes through the control lead 74 and the lead 100 to the relay coil 142 of the arming switch control means 90 and to the relay coil 148 of the cutout switch control means 94. Thus, the relay coils 142 and 148 are energized to thus effect the closing of the arming switch 82 and the opening of the cutout switch 84, the cutout switch being opened so as to prevent the pump motor 16 from being energized during the starting of the vehicle engine.

As soon as the vehicle engine starts, the operator will release the start switch 126 and the latter will move to its normally open position. The flow of current through the control line 74 is thus interrupted; however, the relay coil 142 of the arming switch control means remains energized since a current path will now be established to the relay coil 142 through means of the latching current line 104. Also, the light 108 will now be lit if the current path to the relay coil 142 is operative. It is here noted that the diode 106 prevents the passage of current in the direction from the latching current line 104 to the line 100 so as to prevent the starting motor control means 68 and the cutout switch control means 102 from being actuated so as to respectively prevent the starting motor 72 from being energized and the cutout switch 84 from being opened, the latter of course having moved to its normally open position when the current to the relay coil 148 was interrupted.

Once the vehicle engine starts, the main pump 12 is driven and assuming it is in working order, the fluid delivered thereby will move the one-way check valve 34 to its open position to in turn cause the fluid condition-responsive switch means 86 to be moved to its open position. Thus, the open switch means 86 is all that remains to prevent the flow of current in the control line 80.

If, during operation of the vehicle, the main pump 12 becomes inoperative to supply sufficient fluid pressure to maintain the one-way check valve 34 open, the valve 34 will close and consequently close the fluid condition-responsive switch means 86 to complete the circuit through the control line 80 to the ground connection 78. Thus, the relay coil 154 of the pump motor control means 70 is energized to effect the closure of the switch 158 which results in the relay coil 164 being energized to effect the closure of the switch 168 and the actuation of the motor 16 and the warning device 116. The motor 16 then drives the pump 14 to supply the fluid pressure for actuating the steering motor 40 as desired. It is here noted that the one-way check valve 34 remains closed during the operation of the auxiliary pump 14. The one-way check valve 34 also prevents fluid from draining through the pump 12 to the sump 20 when the auxiliary pump 14 is operating, and the one-way check valve 36 performs a similar function to prevent fluid from draining to the reservoir 20 through the pump 14 when the pump 12 is operating.

The operator may wish to have power steering when the vehicle engine is stopped, as when the vehicle is being towed or pushed, and he may effect such power steering by first moving the ignition switch 124 to the position for connecting the battery 52 to the "accessories" contact 64 and then by closing the manually operable switch 120. This completes a circuit by which current is connected to the pump motor control means 70, it being noted that the fluid condition-responsive switch means 86 is now closed so as to complete a circuit through the control line 80. This energization of the pump motor control means 70 of course results in the actuation of the electric motor 16, as described above, to drive the auxiliary pump 14. The diode 118 acts to prevent current from passing from the manual control current line 120 to the arming relay coil 142 by way of the latching current line 104 as would be possible in the absence of the diode 118.

The operation of the power steering system 10 with the fluid system as disclosed in FIG. 3 substituted for the corresponding portions shown in FIG. 1 is substantially the same as that above described; however, it is to be noted that whenever the vehicle engine is operating the main pump 174 acts to maintain a given pressure in the feed line 28 and the check valve 34 will thus be closed whenever the steering valve 176 is in its neutral position as shown. Thus, the check valve 34 would be unsuitable for operating the fluid condition-responsive switch means 86 since it would close the switch means anytime that the pressure in the branch 30 would become balanced at the opposite sides of the valve 34. However, the pressure responsive piston 180 does act suitably for maintaining the fluid responsive switch means open as long as there is a predetermined minimum amount of pressure in the branch line 30.

Likewise, the operation of the steering system 10 with an ignition and start switch means as disclosed in FIG. 4 will operate quite similarly to the system, as described above, having the ignition and starting switch means shown in FIG. 2, the main difference being that in order for the operator to start a vehicle with the switch means shown in FIG. 4, he need only to operate the one rotary switch to effect the connection of the battery 52 to either one or both of the "on" and "start" contacts 60 and 62, the contacts 60 and 62 being arranged for connection to the battery in parallel instead of in series as shown in FIG. 2.

We claim:

1. In a vehicle having a main power steering system including a hydraulic system including a main pump fluid connected to a fluid operable steering motor by means including a steering valve; the vehicle further having an electrical ignition and starting system including ignition and starting switch means selectively operable to at least establish "off", "on" and "on-start" conditions for respectively connecting a source of electrical energy to an "off" contact, to an "on" contact and simultaneously to the "on" contact and a "start" contact, an electrohydraulic safety backup steering system comprising: an auxiliary pump being fluid connected to said steering motor by means including said steering valve; an electrically responsive drive means being connected to, and energizable for, driving said auxiliary pump; a normally open arming switch and a normally closed fluid condition-responsive switch being connected in series with each other and with said "on" contact, with the arming switch being between said "on" contact and said fluid condition-responsive switch and with the fluid condition-responsive switch being connected to ground, thus forming a drive means control circuit; an electrically responsive drive means control means being connected to said drive means and to said source of electrical energy and being responsive only when said arming and fluid condition-responsive switches are closed for connecting said source of electrical energy to said drive means; fluid condition-sensing means being positioned in direct fluid communication with the outlet of the main pump and being connected to said fluid condition-responsive switch for closing the latter only when the fluid delivered by the main pump is inadequate for operating the steering motor; an electrically responsive arming switch control means being connected to said "start" contact and to said arming switch for closing the latter only when said "start" contact is connected to said source of electrical energy; and a latching current supply lead connecting said arming switch control means to said drive means control circuit at a location between and in series with said arming and fluid condition-responsive switches.

2. The vehicle defined in claim 1 and further including an electrically responsive starting motor control means connected to said "start" contact in parallel with said arming switch control and a diode being connected between said starting motor control means and said arming switch control for preventing the flow of current between said latching current supply lead and said starting motor control.

3. The vehicle defined in claim 1 and further including a normally closed cutout switch connected in said drive means control circuit in series with said arming and fluid responsive switches; electrically responsive cutout switch control means connected to said cutout switch and to said "start" contact for opening said cutout switch when said "start" contact is connected to the source of electrical energy.

4. The vehicle defined in claim 1 and further including a test circuit having a normally open time delay switch connected at one side to said "on" contact and at its other side to said drive means control means; and an electrically responsive indicating device being connected between said drive means control means and said drive means for apprising the operator of the fact that the drive means is actuated; and said time delay switch being responsive to complete the test circuit to said drive means control means for a predetermined interval of time after the "on" contact has been connected to the source of electrical energy, whereby the operator may check the operability of the drive means control means and the drive means prior to starting the vehicle by merely operating said ignition and starting switch means to establish said "on" condition.

5. The vehicle defined in claim 4 wherein said test circuit bypass circuit includes a lead means extending between said arming switch and said time delay switch; and said lead having a contact positioned so as to be engaged by said arming switch when the latter is open to thereby connect the time delay switch to said "on" contact.

6. The vehicle defined in claim 4 wherein said test current bypass circuit includes a lead means extending between said time delay switch and said drive means control circuit at a location between and in series with arming and fluid condition-responsive switches; and a diode being connected in said drive means control circuit between said last-named location and said latching current supply lead for preventing the flow of current from said time delay switch to said latching current supply lead when said time delay switch is closed to complete a circuit to said drive means control means.

7. The vehicle defined in claim 1 wherein said ignition and starting switch means is further operable to establish an "accessories" condition wherein said source of electrical energy is connected to an "accessories" contact; a manual operation bypass circuit having a normally open manual operation switch connected between said "accessories" contact and said drive means control means whereby said drive means may be actuated for driving the auxiliary pump without the vehicle engine being started.

8. The vehicle defined in claim 1 wherein said fluid condition-sensing means includes a pressure sensitive piston connected to said fluid condition-responsive switch and operative for closing the same in response to the fluid pressure delivered by the main pump falling to a predetermined minimum and wherein said hydraulic system is a closed-center system.

9. The vehicle defined in claim 1 wherein said fluid condition-sensing means includes a flow sensitive valve member connected to said fluid condition-responsive switch and operative for closing the same in response to the flow from said main pump falling to a predetermined minimum and wherein said hydraulic system is an open-center system.

10. The vehicle defined in claim 1 wherein said drive means control means includes a first relay coil connected in series with said normally open fluid condition-responsive switch, a first normally open switch connected to said source of electrical energy in parallel with said motor and in series with a grounded relay coil, a second normally open switch being between and connected to said source of electrical energy and said source, and first and second stem means being respectively surrounded by said first and grounded relay coils and being respectively fixed to said first and second normally open switches so as to respectively effect to closure of said switches upon said relay coils becoming energized.

11. The vehicle defined in claim 10 and further including a diode connected in parallel with said first relay coil so as to prevent the current resulting from the de-energization of the first relay coil from passing in a direction through said fluid condition-responsive switch to thus prevent the establishment of a current path which would result in sparking at the arming switch when the latter is opened by actuating the ignition and starting switch means between the position connecting the source of electrical energy to the "on" contact and the position connecting the source of electrical energy to the "off" contact.

* * * * *